(12) United States Patent
Gwak et al.

(10) Patent No.: US 6,558,574 B2
(45) Date of Patent: May 6, 2003

(54) RED PHOSPHOR HAVING EFFECTIVE EMISSION AT LOW VOLTAGES AND METHOD FOR PREPARING THE SAME USING CONDUCTIVE LUMINESCENT MATERIAL

(75) Inventors: Ji-hye Gwak, Seoul (KR); Shang-hyeun Park, Chungcheongnam-do (KR); Yong-wan Jin, Seoul (KR); V. A. Vorobyov, Stavropol (RU)

(73) Assignees: Samsung SDI Co., Ltd. (KR); ZAO Scientific Production Firm (SPF) Luminphor (RU)

( * ) Notice: Subject to any disclaimer, the term of this patent is extended or adjusted under 35 U.S.C. 154(b) by 0 days.

(21) Appl. No.: 09/742,339

(22) Filed: Dec. 22, 2000

(65) Prior Publication Data

US 2001/0013592 A1 Aug. 16, 2001

(30) Foreign Application Priority Data

Dec. 23, 1999 (KR) .............................. 99-61332

(51) Int. Cl.[7] .............................................. C09K 11/66
(52) U.S. Cl. ........................ 252/301.4 F; 252/301.4 R; 252/301.6 R; 428/403; 428/404
(58) Field of Search ................... 252/301.4 F, 301.4 R, 252/301.6 R; 428/403, 404

(56) References Cited

U.S. PATENT DOCUMENTS

| 4,027,192 A | 5/1977 | Hanak ........................ 313/498 |
|---|---|---|
| 4,208,612 A | 6/1980 | Hase et al. .................. 313/495 |
| 4,208,613 A | 6/1980 | Hase et al. .................. 313/495 |
| 4,303,913 A | * 12/1981 | Tohda et al. .......... 252/301.4 F |
| 4,314,177 A | * 2/1982 | Matsuoka et al. .... 252/301.4 F |

FOREIGN PATENT DOCUMENTS

JP  10212473  8/1998

OTHER PUBLICATIONS

H. Kominami, et al., "Low Voltage Cathodoluminescent Properties of Phosphors Coated with $In_2O_3$ by Sol–gen Method," Applied Surface Science 113/114 (1997), pp. 519–522.

Hiroko Kominami et al, "Improvement of Low Voltage Cathodoluminescent Properties of Zinc Sulfide Phosphors by Sol–Gel Method", Jpn. J. Appl. Phys., vol. 35 (1996), pp. L1600–L1602.

* cited by examiner

Primary Examiner—C. Melissa Koslow
(74) Attorney, Agent, or Firm—Burns, Doane, Swecker & Mathis, LLP

(57) ABSTRACT

A red phosphor having effective emission at low voltages, prepared using a conductive luminescent material, and a method for preparing the same, which is applicable in low-voltage driving image display displays such as field emission displays (FEDs) with improved luminance. By coating the surface of a red phosphor with the conductive luminescent material, accumulation of charges in FEDs can be prevented and thus the luminance is enhanced.

7 Claims, 5 Drawing Sheets

CIE x

RED PHOSPHOR HAVING EFFECTIVE EMISSION AT LOW VOLTAGES AND METHOD FOR PREPARING THE SAME USING CONDUCTIVE LUMINESCENT MATERIAL

This application claims priority under 35 U.S.C. §§ 119 and/or 365 to 99-61332 filed in Korea on Dec. 23, 1999; the entire content of which is hereby incorporated by reference.

BACKGROUND OF THE INVENTION

1. Field of the Invention

The present invention relates to a red phosphor leading to sufficient luminescent at an image display devices driven with low voltages, such as field emission devices (FEDs), which is obtained using a conductive luminescent material, and a method for preparing the same.

2. Description of the Related Art

A conductive layer such as aluminum (Al) layer, which are used in cathode ray tube (CRTs), cannot be employed in FEDs, which are operated with a relatively high current density and low voltage. For this reason, use of commercially available phosphors in FEDs causes accumulation of space charges on the surface of the phosphors, and thus luminescence is lowered. This problem has been considered to be serious in applying phosphors to devices operating with low voltages. In order to avoid formation of potential barriers by space charges, a conductive material such as indium oxide or tin oxide is mixed with a phosphor or is coated on a phosphor to enhance the conductivity. Also, another approach suggests use of a conductive material as a host of phosphor to enable excitation with low voltages.

A technique of adding or coating indium oxide or tin oxide was disclosed in U.S. Pat. Nos. 4,027,192; 4,208,612; and 4,208,613, and JP No. 10212473. These materials have been applied as simple conductive materials in vacuum fluorescent displays (VFDs) after verification. However, the effect of the materials on luminance at FEDs is unclear yet. Reportedly, good results are obtainable only when the driving voltage is 400V or less (H. Kominami et al., "Low Voltage Cathodoluminescent Properties of Phosphors Coated With $In_2O_3$ by Sol-gel Method," *Applied Surface Science* 113/114 (1997) 519–522, and R. Durny et al., "Semiconductors," "Superconductors," "Magnetism," "Optics and Quantum Electronics," "Optical Properties of Condensed Matter," "Structure and Mechanical and Thermal Properties of Condensed Matter," "Surfaces, Interfaces, and Films," and "Instrumentation, Measurement, and Fabrication Technology," *Japanese J. of Appl. Phys.* Vol. 35 (1996) Pt. 2, No. 12A). Thus, there is a need for further enhancing luminance for FEDs.

SUMMARY OF THE INVENTION

To solve the above problems, it is an objective of the present invention to provide a phosphor having effective emission at low voltages, and a method for preparing the same, in which a material having both conductive and luminescent properties is mixed with a red phosphor, or the material is coated on a phosphor, to minimize accumulation of space charges with enhanced conductivity and decreased drop of luminance.

According to an aspect of the present invention, there is provided a red phosphor having effective emission at low voltages, the red phosphor mixed with a conductive luminescent material expressed by $(Sn_{1-x}Eu_x)O_2$, in a predetermined concentration.

Preferably, the red phosphor is coated with the conductive luminescent material expressed by $(Sn_{1-x}Eu_x)O_2$. Preferably, the concentration of the conductive luminescent material expressed by $(Sn_{1-x}Eu_x)O_2$ mixed with or coated on the red phosphor is in the range of $5 \times 10^{-2}$ to 5% by weight. Preferably, in the expression of $(Sn_{1-x}Eu_x)O_2$, x is a value from 0.0005 to 0.2.

According to another aspect of the present invention, there is provided a method of preparing a red phosphor having effective emission at low voltages, using a conductive luminescent material, the method comprising: (a) synthesizing a red phosphor $Y_2O_3$:Eu as a base phosphor, immersing the red phosphor into an ammonium hydroxide aqueous solution, and adding and stirring a solution containing $Eu^{3+}$ and $Sn^{4+}$ salts to the solution to form a precipitate on the red phosphor; (b) filtering and drying the precipitate; and (c) firing the dried precipitate at a temperature of 700 to 800° C. to coat $SnO_2$:Eu on the red phosphor.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

A phosphor having effective emission at low voltages according to the present invention is characterized in that instead of a conventional simple conductive material ($SnO_2$), a conductive luminescent phosphor ($SnO_2$:Eu), which is obtained by doping a conductive material ($SiO_2$) with an activator ($Eu^{3+}$) capable of emitting a wavelength of light in a desired color region, is coated on a red phosphor or is mixed with a red phosphor.

$SnO_2$:Eu is widely known as a phosphor which, when excited at a low voltage, produces an orange-red color (having a peak wavelength of 595 nm). The phosphor having effective emission at low voltages is coated on a red phosphor by the method illustrated in FIG. 2, or is mixed with a red phosphor, so that a decrease in luminance can be prevented with improved conductivity. As s result, a higher luminance can be ensured over a more wide voltage region, compared to conventional methods.

Figure 2:
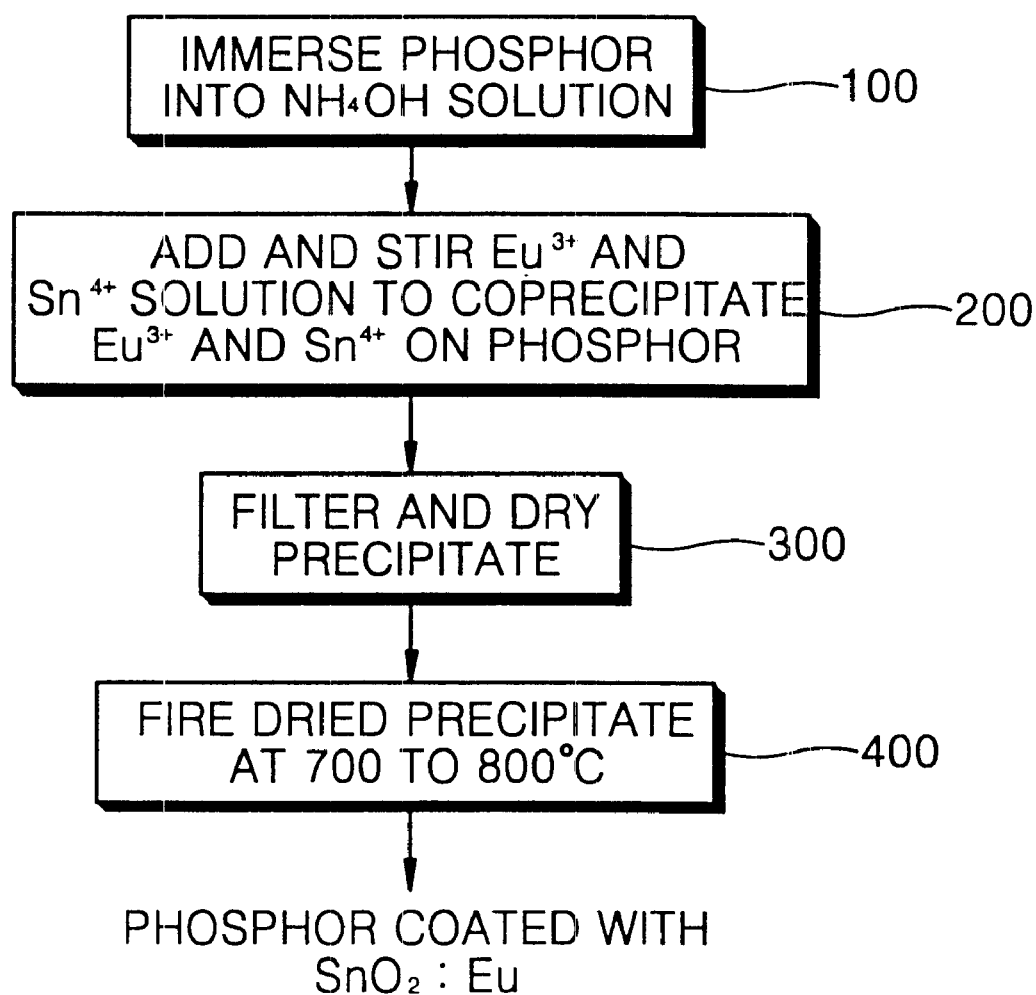
FIG. 2 illustrates successive stages of a method for preparing a red phosphor having effective emission at low voltages according to the present invention.

A method for preparing a red phosphor having effective emission at low voltages, using the conductive luminescent material, $SnO_2$:Eu, is illustrated in FIG. 2. Firstly, as a base phosphor, a red phosphor ($Y_2O_3$:Eu) is synthesized, and immersed into an ammonium hydroxide ($NH_4OH$) aqueous solution (step 100). Next, a solution containing $Eu^{3+}$ and $Sn^{4+}$ salts is added to the solution and stirred (step 150) to coprecipitate $Eu^{3+}$ and $Sn^{4+}$ in hydroxide form on the red phosphor (step 200). Then, the precipitate is filtered and dried (step 300). The dried precipitate is fired at a temperature of 700 to 800° C. (step 400), which results in a red phosphor coated with $SnO_2$:Eu.

The following examples are for comparison with other coating materials and other base phosphors, and not intended to limit the scope of the invention.

EXAMPLE 1

Three phosphor samples were prepared as follows.

Sample 1: As a base phosphor, a red phosphor, $Y_2O_3$:Eu, was synthesized.

Sample 2: A conductive luminescent material, $(Sn_{1-x}Eu_x)O_2$, where x=0.01, was coated on Sample 1 in an amount of 1% by weight, using the method of FIG. 2.

Sample 3: A conventional coating material, $SnO_2$, was coated on Sample 1 in an amount of 1% by weight, using the method of FIG. 2.

Figure 3:
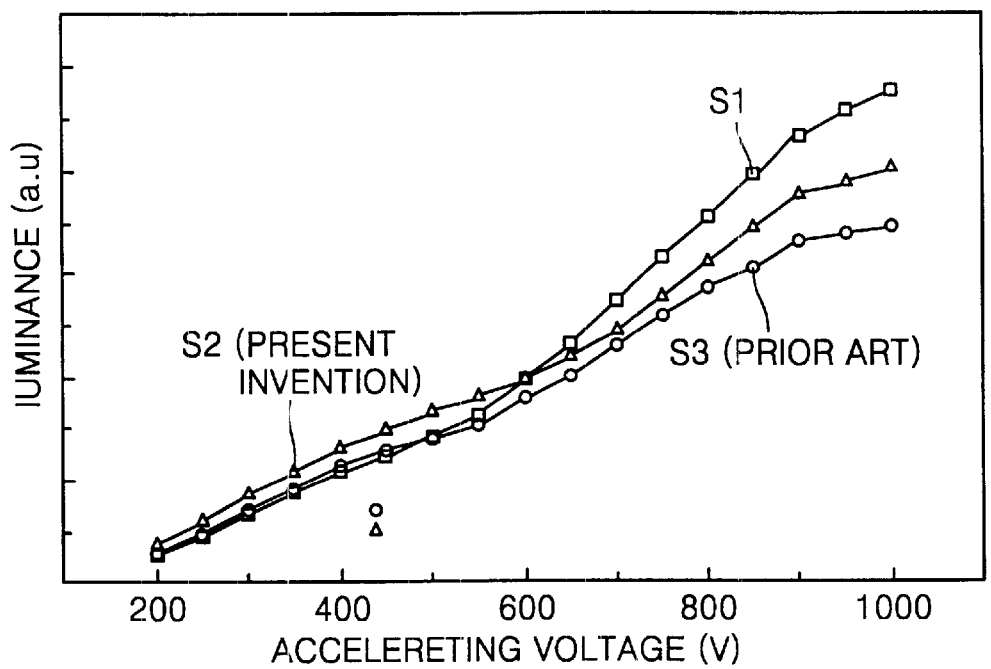
FIG. 3 is a graph comparatively illustrating the luminance at voltages equal to or lower than 1 kV, of a base $Y_2O_3$:Eu phosphor, a $SnO_2$:Eu-coated red phosphor according to the present invention, and a conventional phosphor coated with $SnO_2$.
Figure 4:
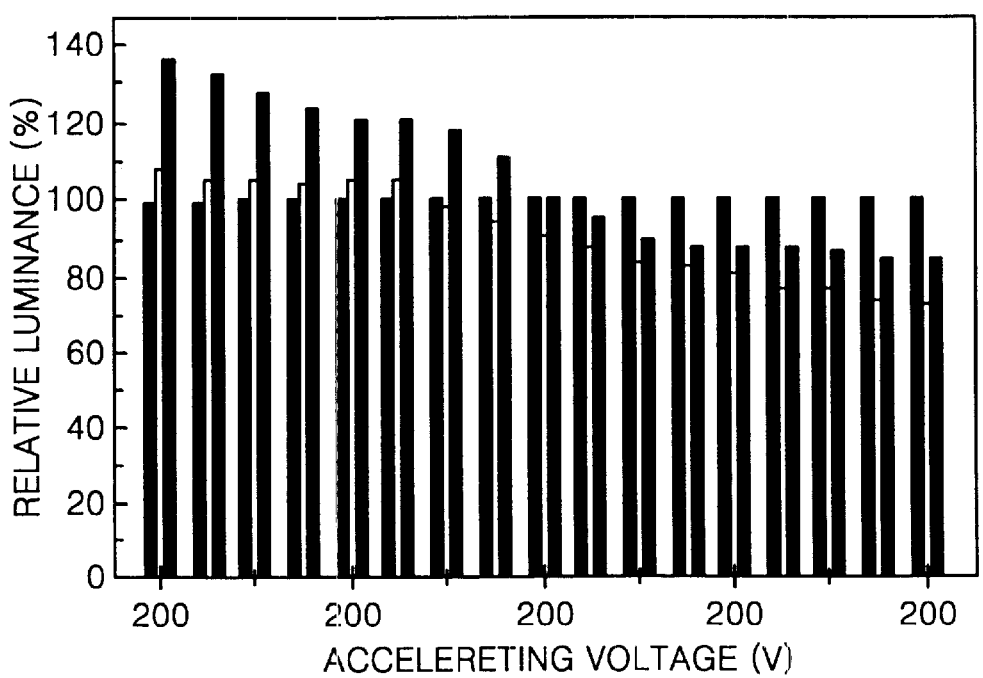
FIG. 4 is a graph showing a relative luminance at voltages equal to or lower than 1 kV, of the $SnO_2$: Eu-coated red phosphor according to the present invention and the conventional phosphor coated with $SnO_2$, relative to the base $Y_2O_3$:Eu phosphor.

The comparison results are shown in FIGS. 3 and 4. The $SnO_2$:Eu-coated red phosphor (S2) according to the present invention shows 15% higher luminance on the average over all of the measured voltage levels, than the conventional red phosphor (S3) coated with the simple conductive material $SnO_2$. While the conventional phosphor shows a higher luminance than the base red phosphor (S1) at a voltage equal to and lower than 450V, the $SnO_2$:Eu-coated red phosphor according to the present invention shows a higher luminance over a more wide range of voltage ($\leq$600V), than the base phosphor. FIG. 3 comparatively illustrates the luminance at voltages equal to or lower than 1 kV, of the base $Y_2O_3$:Eu phosphor, the $SnO_2$:Eu-coated red phosphor according to the present invention, and the conventional phosphor coated with $SnO_2$. FIG. 4 is a graph showing a relative luminance at voltages equal to or lower than 1 kV, of the $SnO_2$:Eu-coated red phosphor according to the present invention and the conventional phosphor coated with $SnO_2$, relative to the base $Y_2O_3$:Eu phosphor. In FIG. 4, the left one of three different bars is for the bare reference red phosphor, the middle one is for the conventional $SnO_2$-coated red phosphor, and the right one is for the $SnO_2$:Eu-coated red phosphor according to the present invention.

EXAMPLE 2

Sample 1: A conventional coating material, $SnO_2$, was coated on a commercial $Y_2O_3$:Eu red phosphor in an amount of 1% by weight.

Sample 2: A conductive luminescent material, $(Sn_{1-x}Eu_x)O_2$, where x=0.02, was coated on a commercial $Y_2O_3$:Eu red phosphor in an amount of 1% by weight. Sample 1 coated with $SnO_2$ shows 16% higher luminance at 300V than Sample 2.

EXAMPLE 3

Sample 1: $(Y,Gd)_2O_3$:Eu,Bi red phosphor was synthesized as a base phosphor.

Sample 2: A conductive luminescent material, $(Sn_{1-x}Eu_x)O_2$, where x=0.02, was coated on Sample 1 in an amount of 1% by weight.

Figure 1:
FIG. 1 is a scanning electron microscopy (SEM) photo of a red phosphor having effective emission at low voltages according to the present invention, which is obtained by uniformly coating 10% by weight $SnO_2$:Eu on a commercially available red phosphor.
Figure 5:
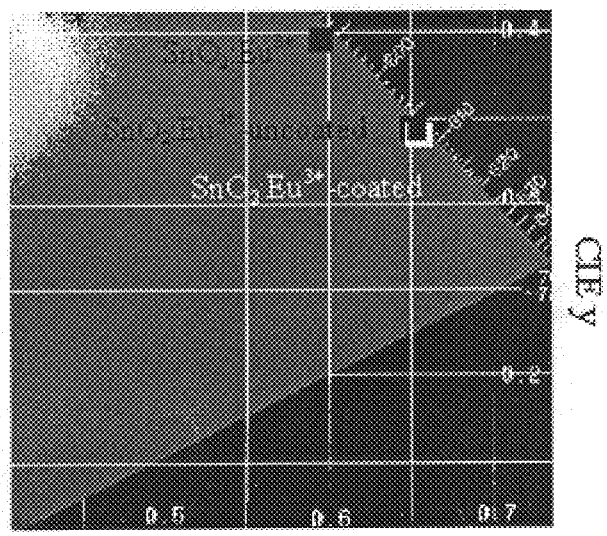
FIG. 5 is a chromaticity diagram of $(Y,Gd)_2O_3$:Eu,Bi red phosphors before and after coating with the conductive luminescent material.
Figure 6:
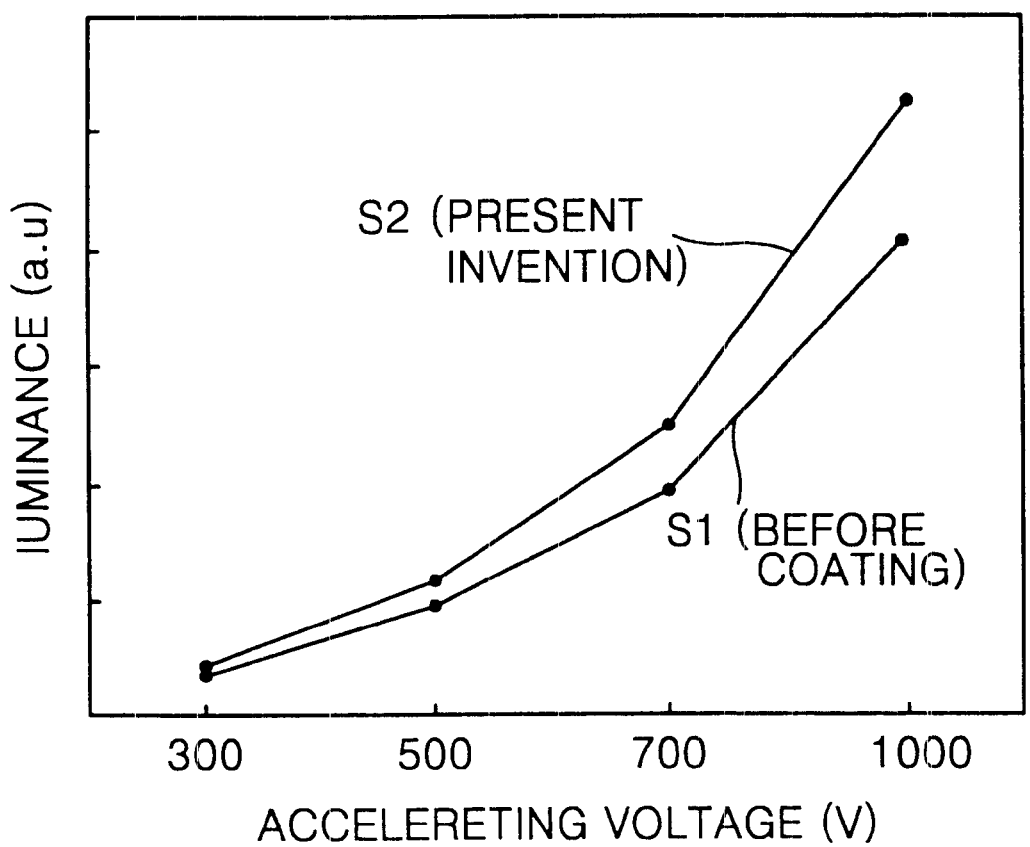
FIG. 6 is a graph showing the luminance of the base $(Y,Gd)_2O_3$:Eu,Bi red phosphor, and the coated $(Y,Gd)_2O_3$:Eu,Bi red phosphor according to the present invention.
Figure 7:
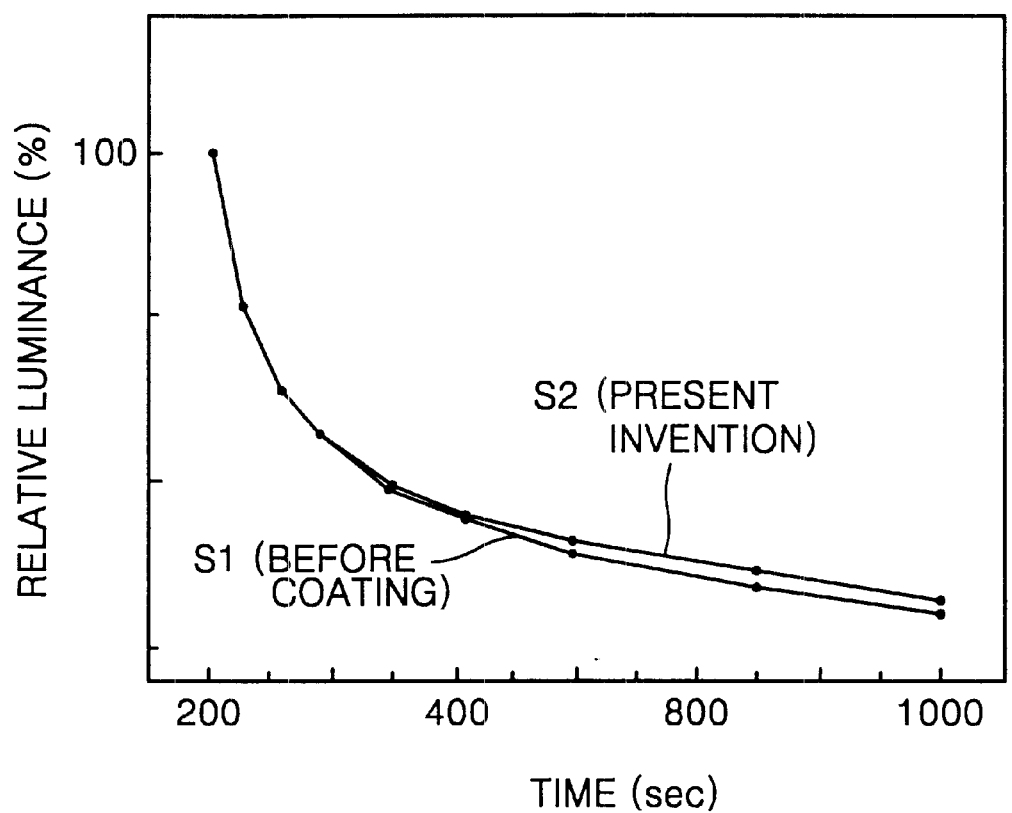
FIG. 7 is a graph showing the variation in relative luminance of the base $(Y,Gd)_2O_3$:Eu,Bi red phosphor, and the coated $(Y,Gd)_2O_3$:Eu,Bi red phosphor according to the present invention, with respect to time.

The comparison results are shown in FIGS. 5 through 7. The $(Sn_{1-x}Eu_x)O_2$-coated red phosphor (S2) according to the present invention shows 25% higher luminance on the average over the entire voltage levels measured, than the base $(Y,Gd)_2O_3$:Eu,Bi red phosphor (S1) without affecting chromaticity coordinates. Also, the inventive $(Sn_{1-x}Eu_x)O_2$-coated red phosphor haves good chemical stability.

As previously mentioned, the red phosphor having effective emission at low voltages according to the present invention is obtained by coating a red phosphor with a conductive luminescent material, which can prevent charges from accumulating in FEDs with improved luminescence. In addition, the chromaticity coordinates or spectra of the red phosphor are barely changed with the enhanced luminescence. Just adding a small amount of an activator during common surface treatment with a conductive material enables to coat a luminescent material on the phosphor, and the preparation involving mixing and firing steps is simple. The inventive red phosphor shows a higher luminance and has a wider range of applications, compared to the use of existing materials.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A red phosphor having effective emission at low voltages, the red phosphor mixed with a conductive luminescent material expressed by $(Sn_{1-x}Eu_x)O_2$, in a predetermined concentration, wherein x is a value from 0.0005 to 0.2, and wherein the red phosphor is coated with the conductive luminescent material expressed by $(Sn_{1-x}Eu_x)O_2$.

2. The red phosphor of claim 1, wherein the concentration of the conductive luminescent material expressed by $(Sn_{1-x}Eu_x)O_2$ mixed with the red phosphor is in the range of $5\times10^{-2}$ to 5% by weight.

3. The red phosphor of claim 1, wherein the concentration of the conductive luminescent material expressed by $(Sn_{1-x}Eu_x)O_2$ coated on the red phosphor is in the range of $5\times10^{-2}$ to 5% by weight.

4. A method of preparing a red phosphor having effective emission at low voltages, using a conductive luminescent material, the method comprising:

(a) synthesizing a red phosphor $Y_2O_3$:Eu as a base phosphor, immersing the red phosphor into an ammonium hydroxide aqueous solution, and adding and stirring a solution containing $Eu^{3+}$ and $Sn^{4+}$ salts to the solution to form a precipitate on the red phosphor;

(b) filtering and drying the precipitate; and (c) firing the dried precipitate at a temperature of 700 to 800° C. to coat $SnO_2$:Eu on the red phosphor.

5. A red phosphor having effective emission at low voltages, the red phosphor mixed with a conductive luminescent material expressed by $(Sn_{1-x}Eu_x)O_2$, in a predetermined concentration, wherein x is a value from 0.0005 to 0.2, and wherein the red phosphor comprises $Y_2O_3$:Eu or $(Y,Gd)_2O_3$:Eu,Bi.

6. The red phosphor of claim 5, wherein the red phosphor is coated with the conductive luminescent material expressed by $(Sn_{1-x}Eu_x)O_2$.

7. The red phosphor of claim 6, wherein the concentration of the conductive luminescent material expressed by $(Sn_{1-x}Eu_x)O_2$ coated on the red phosphor is in the range of $5\times10^{-2}$ to 5% by weight.

* * * * *